(12) United States Patent
Liardet et al.

(10) Patent No.: US 7,590,673 B2
(45) Date of Patent: Sep. 15, 2009

(54) NORMALIZATION AT CONSTANT FLOW OF A NOISE SOURCE FOR RANDOM NUMBER GENERATION

(75) Inventors: Pierre-Yvan Liardet, Peynier (FR); Yannick Teglia, Marseilles (FR); Ambroise Tomei, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 611 days.

(21) Appl. No.: 10/929,140

(22) Filed: Aug. 27, 2004

(65) Prior Publication Data
US 2005/0050125 A1    Mar. 3, 2005

(30) Foreign Application Priority Data
Aug. 28, 2003  (FR) .................................. 03 50468

(51) Int. Cl.
G06F 1/02    (2006.01)
(52) U.S. Cl. .................. 708/250; 708/253; 708/205
(58) Field of Classification Search .................. 708/250
See application file for complete search history.

(56) References Cited

U.S. PATENT DOCUMENTS 4,327,419 A * 4/1982 Deutsch et al. ............. 708/250
4,462,081 A * 7/1984 Lehan ........................ 702/181
4,958,308 A   9/1990 Curbelo
5,265,039 A  11/1993 Curbelo et al.
7,266,575 B2 * 9/2007 Ikeda .......................... 708/250

FOREIGN PATENT DOCUMENTS

EP  1253513  10/2002
GB  2204458  11/1988

OTHER PUBLICATIONS

French Search Report from French Application No. 03 50468, filed Aug. 28, 2003.

* cited by examiner

Primary Examiner—Lewis A Bullock, Jr.
Assistant Examiner—Michael Yaary
(74) Attorney, Agent, or Firm—Lisa K. Jorgenson; William R. McClellan; Wolf, Greenfield & Sacks, P.C.

(57) ABSTRACT

A method and a circuit for normalizing an initial bit flow, provided by a noise source, comprising dividing the bit flow into words of identical lengths, and assigning to each bit word of the initial flow an output state, the occurrence of a word, all the bits of which have identical states, alternately resulting in the assignment of a first state or of a second one.

5 Claims, 1 Drawing Sheet

NORMALIZATION AT CONSTANT FLOW OF A NOISE SOURCE FOR RANDOM NUMBER GENERATION

BACKGROUND OF THE INVENTION

1. Field of the Invention

The present invention relates to the field of random number generators, and more specifically to random number generators in the form of bit flows originating from one or several noise sources, digital or digitized.

2. Discussion of the Related Art

FIG. 1 very schematically shows in the form of blocks an example of a bit flow generator of the type to which the present invention applies.

Such a generator is based on the use of a noise source 1 (NS) providing an analog noise to an analog-to-digital conversion element 2 (CAD) clocked by a clock CLK and providing a bit flow BS. Source 1 is, for example, formed of one or several oscillators having their outputs added up to provide an analog noise at the input of converter 2. Converter 2 may, in simplified fashion, be a comparator associated with a flip-flop.

The quality of a random generator or more generally of a noise source is measured by the quality of its random character, that is, the equiprobability for flow BS to provide any number and, in particular, the equiprobability of finding 0s and 1s in the flow.

In practice, there are risks for flow BS provided by converter 2 not to have an equiprobable distribution of its elements (bits or bit words). In particular, noise source 1 generally uses oscillators for which there is a risk of synchronization, together or with clock CLK. In case of a synchronization, the output state (flow BS) remains constant.

To improve the equiprobability of a bit flow supposed to be random, flow BS crosses a normalization circuit 3 (NORM) providing a modified bit train NBS and in which the equiprobable character of the zeros and ones in the flow is improved.

FIG. 2 shows a conventional example of a circuit 3 for normalizing a bit flow BS applying a so-called Von Neumann method. Such a circuit 3 is based on an analysis of incoming bit flow BS, by bit pairs. A storage element 4 (BUFF) enabling processing of the bits, by pairs, in a state determination circuit 5 which provides normalized bit flow NBS, is then used. According to the Von Neumann method, if the bit pair is 10, a state 1 is generated. If the bit pair is 01, a state 0 is generated. If the bit pair is 00 or 11, it is ignored, that is, no state is output.

A disadvantage of the Von Neumann method is that the rate of normalized bit flow NBS is not constant, that is, the period with which the bits are provided is not regular. In a simple Von Neumann circuit such as described hereabove, the bit rate of flow NBS varies between twice and four times less than the rate of input flow BS.

SUMMARY OF THE INVENTION

The present invention aims at providing a normalization of a noise source providing a digital bit flow which improves known Von Neumann solutions.

The present invention more specifically aims at making the output rate of the normalization element constant.

The present invention also aims at increasing the flow rate with respect to a normalization of Von Neumann type.

To achieve these and other objects, the present invention provides a method for normalizing an initial bit flow, provided by a noise source, comprising:

dividing the bit flow into words of identical lengths; and assigning to each bit word of the initial flow an output state, the occurrence of a words, all the bits of which have identical states, alternately resulting in the assignment of a first state or of a second one.

According to an embodiment of the present invention, each word with mixed states provides a first state and its inverse according to the state of the first bit in the word.

According to an embodiment of the present invention, the alternation of the output states provided for two words of bits of identical states is independent from the concerned states.

The present invention also provides a circuit for normalizing an initial bit flow provided by a noise source, comprising:

an element for storing the initial flow for authorizing an exploitation of the bits by words of identical length; and an element for determining the state of an output bit according to the combination of the states of each input word, the state provided upon occurrence of a word of bits of identical states switching upon each occurrence of such a word.

The foregoing objects, features, and advantages of the present invention will be discussed in detail in the following non-limiting description of specific embodiments in connection with the accompanying drawings.

DETAILED DESCRIPTION

Figure 1:
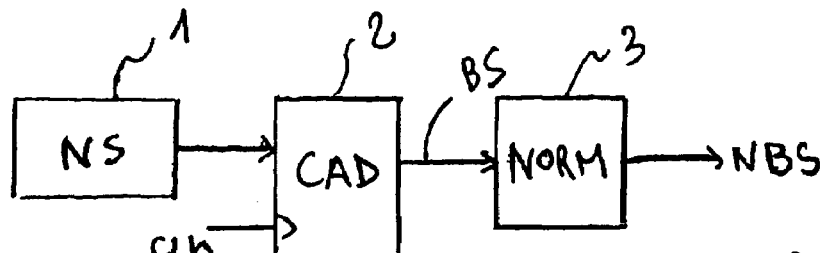
FIGS. 1 and 2, previously discussed, are intended to show the state of the art and the problem to solve.

The same elements have been designated with the same references in the different drawings. For clarity, only those elements which are necessary to the understanding of the present invention have been shown in the drawings and will be described hereafter. In particular, the obtaining of the bit flow to be normalized has not been detailed, the present invention being implementable whatever this flow and especially whether it has or not been submitted to other normalization processings. Similarly, the destination of the normalized bit flow obtained by the present invention is compatible with all conventional uses of bit flows for random generators and especially for a combination, for example, by association in parallel of several bit flows, to obtain random words. For simplification, the present invention will be described in relation with an incoming flow processed by words of two consecutive bits. It, however, applies to words of greater length.

A feature of the present invention is, in a normalization method of Von Neumann type, to assign an output state to the words having bits of same state. According to the present invention, this assignment is not always performed in the same way as is the case for words with mixed states (for example, pairs 01 and 10), but is inverted for each new word of bits of identical states (for example, pairs 00 and 11).

Conversely to what used to be believed, it is possible to assign an output state to the identical bit pairs while keeping an equiprobable flow, by inverting the states output for such cases.

Figure 3:
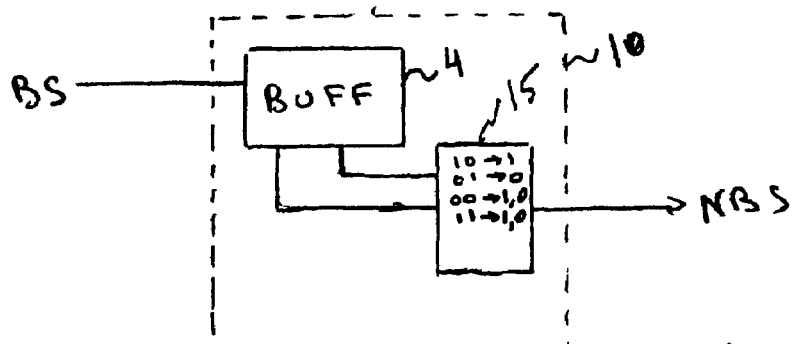
FIG. 3 very schematically shows in the form of blocks an embodiment of a normalization circuit according to the present invention.

FIG. 3 very schematically shows in the form of blocks an embodiment of a normalization circuit according to the present invention.

Figure 2:
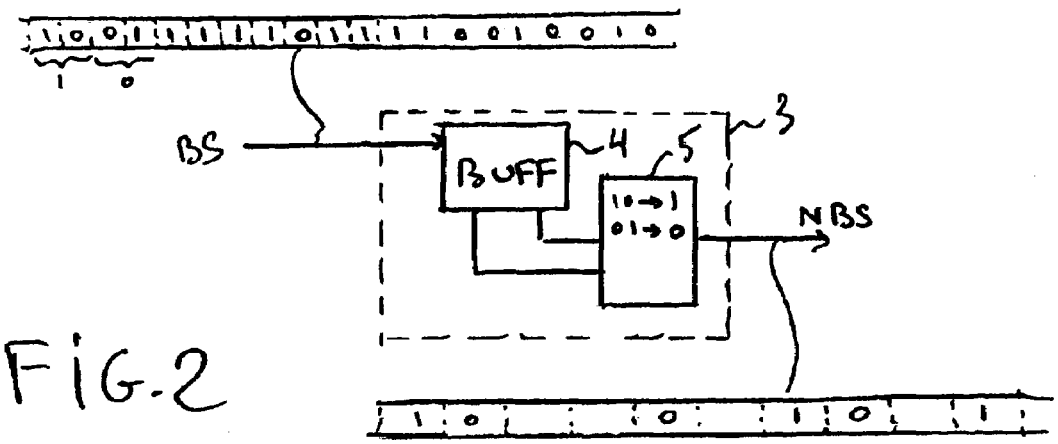

As in the conventional case of FIG. 2, at least one bit of incoming flow BS is stored (block 4, BUFF) to enable processing of the flow bits by pairs. According to the way in which the bit pairs are processed in practice, two successive bits of flow BS, or even more, may have to be stored.

According to the present invention, a state determination element 15 provides a normalized output bit flow NBS according to the respective states of the current bit pair. As compared to a conventional element (5, FIG. 2), element 15 assigns a state not only to pairs 10 and 01, but also to pairs 00 and 11. According to the present invention, on each occurrence of a pair of identical states, the state 0 or 1 inverse of that which has been previously assigned to a pair of identical states is assigned. The bit pairs having different states are assigned, as previously, states 1 for pairs 10 and states 0 for pairs 01 (or conversely).

According to a first implementation mode, account is indifferently taken of state pairs 00 and 11 to perform this inversion.

With such an implementation and assuming, for example, that a state 0 will be assigned upon first occurrence of a doublet, an incoming bit flow BS 01100001101111110100 translates as a normalized output flow NBS 0100110100.

According to a second implementation mode, the inversion is performed with respect to the state of the output bit assigned to a previous pair of the same type (00 or 11).

With such an implementation and assuming, for example, that a state 0 will be assigned upon first occurrence of a doublet 00 and that a state 1 will be assigned upon first occurrence of a doublet 11, an incoming bit flow BS 01100001101111110100 translates as a normalized output flow NBS 0100110101.

An advantage of the present invention is that the rate of the normalized bit flow thus obtained is only divided by two with respect to the original flow.

Another advantage is that this flow rate is constant.

Of course, the present invention is likely to have various alterations, modifications, and improvements which will readily occur to those skilled in the art. In particular, the practical implementation of a normalization circuit according to the present invention, be it in hardware or software form, is within the abilities of those skilled in the art based on the functional indications given hereabove, using conventional tools.

Further, although the present invention has been described in relation with the exploitation of bit pairs, it more generally applies whatever the length (even or odd) of the considered words or sections of the incoming flow. For example, the incoming bits may be processed four by four where the conventional Von Neumann method does not consider words with four bits of identical states (0000 and 1111). Adapting the described embodiments to words of more than two bits is within the abilities of those skilled in the art.

Having thus described at least one illustrative embodiment of the invention, various alterations, modifications, and improvements will readily occur to those skilled in the art.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for normalizing an initial bit flow, provided by a noise source, comprising:
   dividing the initial bit flow into words of identical lengths in a storage circuit; and
   assigning to each word of the initial bit flow an output state in a determination circuit, the occurrence of a word, all the bits of which have identical states, alternately resulting in an assignment by the determination circuit of a first output state or of a second output state, wherein an output state assigned to each word, all the bits of which have identical states, is inverted with respect to the output state assigned to a previous word, all the bits of which have identical states.

2. The method of claim 1, in which each word having bits with mixed states provides a first state and its inverse according to the state of a first bit in the word.

3. The method of claim 1, in which an alternation of the output states provided for two words having bits with identical states is independent from the states of the bits in the two words.

4. A circuit for normalizing an initial bit flow provided by a noise source, the circuit comprising:
   a storage circuit for storing the initial bit flow as input words of identical length; and
   a determination circuit for determining a state of an output bit according to the combination of states of bits of each input word, wherein the state of the output bit provided upon occurrence of a word having bits of identical states is inverted with respect to the state of the output bit provided upon occurrence of a previous word having bits of identical states.

5. A system for generating a normalized bit flow, the system comprising:
   at least one noise source and at least one analog-to-digital conversion circuit to generate an initial bit flow;
   a storage circuit to store at least a portion of the initial bit flow to allow processing of the initial bit flow as input words of identical length; and
   a determination circuit connected to said storage circuit to detect a state of each bit in each input word, and to output a normalized bit flow, the normalized bit flow comprising output bits, wherein the state of an output bit determined for each input word having all bits of identical states switches upon each occurrence of an input word having all bits of identical states.

* * * * *

UNITED STATES PATENT AND TRADEMARK OFFICE
CERTIFICATE OF CORRECTION

PATENT NO. : 7,590,673 B2 Page 1 of 1
APPLICATION NO. : 10/929140
DATED : September 15, 2009
INVENTOR(S) : Liardet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Twenty-first Day of September, 2010

David J. Kappos
*Director of the United States Patent and Trademark Office*